(12) United States Patent
Swainson

(10) Patent No.: US 7,811,001 B2
(45) Date of Patent: *Oct. 12, 2010

(54) BEARING HOUSING

(75) Inventor: Richard J Swainson, Derby (GB)

(73) Assignee: Rolls-Royce plc, London (GB)

( * ) Notice: Subject to any disclaimer, the term of this patent is extended or adjusted under 35 U.S.C. 154(b) by 394 days.

This patent is subject to a terminal disclaimer.

(21) Appl. No.: 12/126,512

(22) Filed: May 23, 2008

(65) Prior Publication Data

US 2008/0219613 A1    Sep. 11, 2008

Related U.S. Application Data

(63) Continuation of application No. 11/144,636, filed on Jun. 6, 2005, now Pat. No. 7,387,445.

(30) Foreign Application Priority Data

Jun. 30, 2004    (GB)    ................. 0414619.7

(51) Int. Cl.
*F16C 33/66*    (2006.01)

(52) U.S. Cl. ..................... 384/462; 184/11.2
(58) Field of Classification Search ................. 384/462, 384/465–467, 473, 474; 184/11.1, 11.2
See application file for complete search history.

(56) References Cited

U.S. PATENT DOCUMENTS

| | | | | |
|---|---|---|---|---|
| 2,650,671 | A | * | 9/1953 | Brickett ..................... 96/177 |
| 5,494,355 | A | * | 2/1996 | Haase ........................ 384/144 |
| 2006/0054408 | A1 | * | 3/2006 | Swainson ................. 184/6.12 |

FOREIGN PATENT DOCUMENTS

GB    638    *    0/1915

* cited by examiner

*Primary Examiner*—Thomas R Hannon
(74) *Attorney, Agent, or Firm*—Ray Meiers; Meiers Law Office LLC

(57) ABSTRACT

A bearing housing is disclosed herein. The bearing housing includes a chamber with out-take for oil scavenging. The out-take extends across a chordal arc of the chamber. A portion of an outer wall adjacent to the out-take has a spiral divergence.

6 Claims, 1 Drawing Sheet

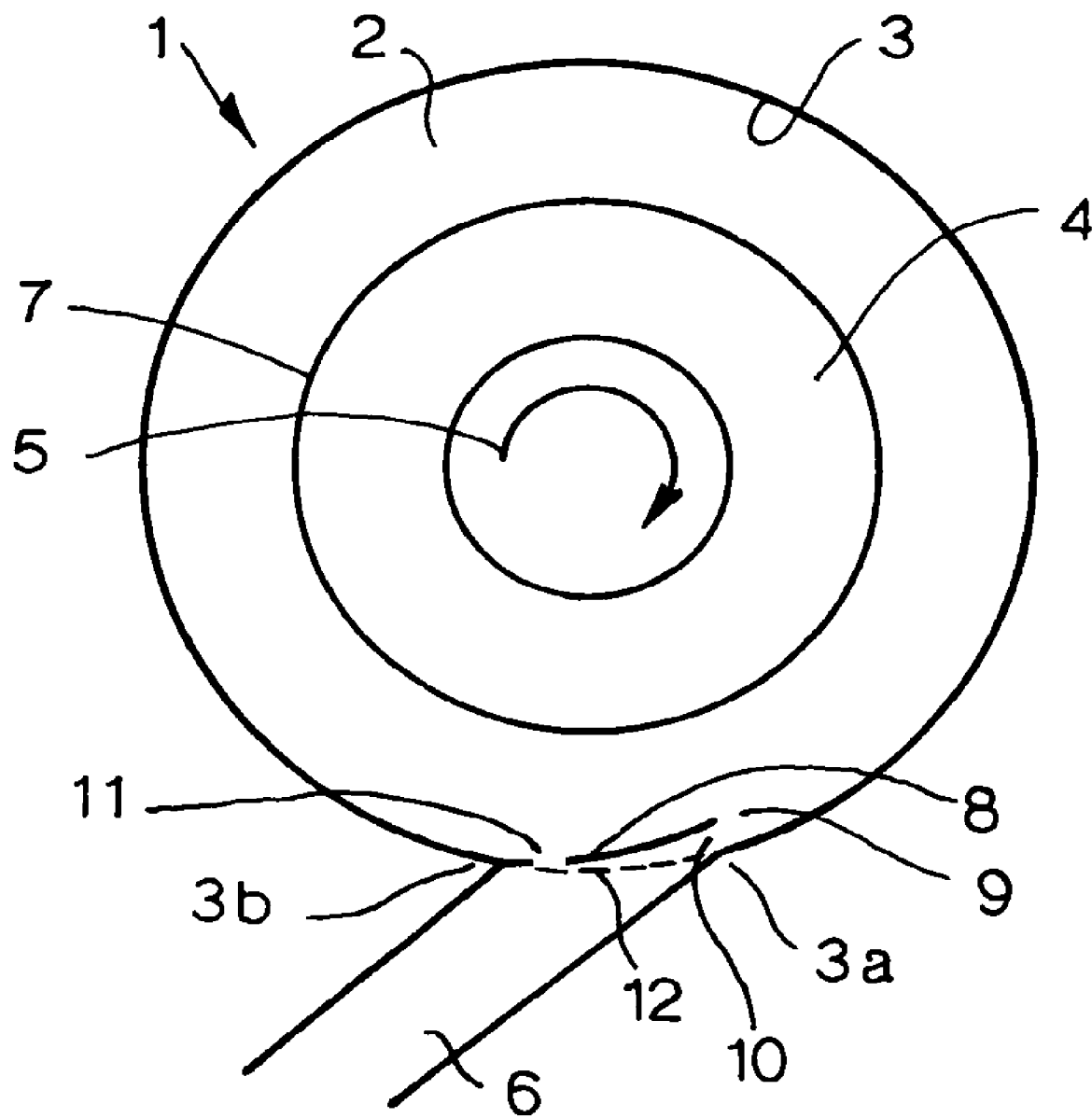

BEARING HOUSING

CROSS-REFERENCE TO RELATED APPLICATIONS

This application is a continuation application of application Ser. No. 11/144,636 for a BEARING HOUSING, filed on Jun. 6, 2005 now U.S. Pat. No. 7,387,445, which is hereby incorporated by reference in its entirety.

BACKGROUND OF THE INVENTION

1. Field of the Invention

The present invention relates to bearing housings and more particularly to bearing housings incorporating an out-take for oil scavenging in order to achieve better oil regulation within a bearing.

2. Description of Related Prior Art

Operation of bearings is well known and generally comprises bearing components appropriately lubricated and cooled by an oil. This oil is injected appropriately and presented to the bearing as required. Clearly, it is desirable to achieve an acceptable level of oil flow through the bearing rather than create long residence times for that oil within the bearing. It will be understood that long residence times will inevitably allow heating of the oil and therefore cause degradation of that oil as well as higher temperatures for the bearing itself.

In order to achieve good oil flow through a bearing, it is common practice to provide some form of oil scavenging. Oil scavenging involves creating a bias towards oil flow through the bearing. One way of creating that bias is utilising the centrifugal forces of rotation of a bearing such that oil is scattered from an outer peripheral edge of the bearing. This scattered oil may be collected in a volute such that utilising gravity or the centrifugal draft effect of bearing rotation or a specific vacuum pump biases flow towards a scavenge out-take is achieved.

Clearly, if the centrifugal draft effect of bearing rotation is to be utilised then provision of a relatively wide chordal arc opening in a casing for the bearing may create pressure loss problems. In such circumstances, previously a single radial scavenge out-take has been utilised at or near the bottom dead centre of the housing. In such circumstances the scattered oil collects in a sump action towards that scavenge out-take. In such circumstances the out-take does not take full advantage of the inherent bearing rotation centrifugal forces to facilitate oil scavenging.

SUMMARY OF THE INVENTION

In summary, the invention is a bearing housing. The bearing housing includes a chamber with out-take for oil scavenging. The out-take extends across a chordal arc of the chamber. A portion of an outer wall adjacent to the out-take has a spiral divergence.

BRIEF DESCRIPTION OF THE DRAWING

Advantages of the present invention will be readily appreciated as the same becomes better understood by reference to the following detailed description when considered in connection with the accompanying drawing wherein:

FIG. 1 is a schematic cross-section of an exemplary embodiment of the invention.

DETAILED DESCRIPTION OF THE EXEMPLARY EMBODIMENT

In accordance with an exemplary embodiment of the present invention there is provided a bearing housing comprising a chamber with out-take for oil scavenging, the out-take extending across a chordal arc of the chamber. As shown in the drawing FIGURE, the exemplary chordal arc can extend less than ninety degrees about a center of said chamber. The portion of the outer wall adjacent to the chordal arc of the chamber has a spiral divergence. Also shown in the drawing is that the exemplary chamber is circular on a side of the out-take opposite the spiral divergence and is circular on a side of the spiral divergence opposite the out-take. The drawing FIGURE also shows that the exemplary spiral divergence can extend less than ninety degrees about a center of said chamber.

An embodiment of the present invention will now be described by way of example and with reference to the accompanying drawing of a schematic bearing housing in accordance with the present invention.

A bearing housing 1 is depicted in the drawing. This housing 1 comprises a chamber 2 having an outer wall 3 about a bearing 4 which rotates in the direction of arrowhead 5. The housing 1 incorporates an oil scavenge out-take 6 positioned generally at the bottom dead centre of the housing 1 but angled to take account of the centrifugal draught effect provided by rotation of the bearing 4 in the direction of arrowhead 5. It will be understood rotation of the bearing 5 will generally throw off or spray oil from an outer peripheral bearing surface 7 and this dispersed oil will be propelled towards the outer wall 3 of the chamber 2. Generally, the surface of the wall 3 towards the bearing 4 will normally incorporate a volute in order to accommodate that oil spray and to prevent potential back splash or flow towards the bearing 4 which may ingress into the bearing inhibiting good oil flow and therefore performance in terms of temperature and lubrication as well as degradation of the longer residing oil within the bearing 4.

In accordance with the present invention, a baffle 8 is provided across the chordal arc presented by the out-take 6. The baffle 8 generally extends inwardly of the chamber 2 in order to create a radially spaced opening 10 between a leading edge 9 and a portion 3a of the outer wall 3. It will be appreciated that collected oil sprayed and incident within the volute or upon the simple surfaces of the wall 3 will pass through the spaced opening 10 into the out-take 6 for normal collection and processing as required.

The baffle 8 can extend at least partially across that chordal arc whereby a radial spaced opening is provided between the baffle 8 and a portion of an outer wall 3 of the chamber 2 adjacent to the leading edge of the baffle 8. A drain can be provided in the baffle 8. Normally, the drain is near to the mounting end of the baffle 8 to the chamber wall 3. Possibly, the baffle 8 is displaceable to vary the radial spaced opening defined by the chordal arc. Typically, the baffle 8 is displaceable by pivot at the mounting end of the baffle 8 to the chamber wall 3.

By use of the baffle 8 it will be understood that the centrifugal draft force created by rotation of the bearing 4 in the direction of arrowhead 5 is more substantially maintained with less pressure loss as a result of the opening of the out-take 6. Similarly, if the out-take 6 is coupled to a vacuum pump the effect of that pump is limited to the cross-sectional area of the opening 10 and therefore is generally more focused.

Nevertheless, it will be understood that as a result of the opening 10 there is a localised pressure loss immediately after that opening 10 and so an inner surface of the baffle 8 is generally more susceptible to oil collection as a result of that effect and simple gravitational sump collection. In such circumstances a drain hole 11 is provided towards the bottom or mounting end of the baffle 8 in order to allow that collected oil to also become entrained in the scavenged oil passing through the out-take 6.

Generally the outer wall 3 of the chamber 2 will be of a slight spiral cross-section such that the wall portion 3a has a spiral divergence from a circular cross-section or circumferential alignment with the opposing part 3b of the housing 1. It will be appreciated that typically the portion 3b is also the position upon which the baffle 8 is mounted.

The baffle 8 will normally be held in a fixed position within a housing 1. Thus this position will define the spaced opening 10 and therefore the effective scoop of the out-take 6 with respect to scavenged oil within the cavity 2. Generally, the baffle 8 may be in circumferrial alignment with the wall 3 about part 3b or slightly within that circumferal line shown by broken line 12 in the drawing. Alternatively, the baffle 8 may be displaceable in order to vary the spaced opening 10 as required by particular operational circumstances with respect to the bearing 4. Displacement may be about a pivot between a mounting end of the baffle 8 upon the outer wall part 3b.

It will be appreciated in addition to scavenging oil from their bearing 4, the present invention also allows scavenging of oil as a film upon the inner surface of the wall 3 of the chamber 2. It will be understood that this wall oil film removes heat from the chamber walls and so can be detrimental. In such circumstances by use of the present baffle 8 it is possible to keep that oil film moving and scavenging back for collection and processing as required with a reduced residence time in the chamber 2. In general it is important to keep the oil flowing in order to avoid degradation by its exposure to high temperatures.

It will be understood that the particular shape, angle and curvature of the baffle 8 will be determined by particular operational requirements of the invention within different sized and shaped bearing housings. Nevertheless, in deciding on the shape, angle and curvature of the baffle 8, generally the objective will be to avoid oil re-circulating in the chamber 2 rather than being forced out of the scavenge out-take 6. By judicious choice of the shape in particular of the baffle 8, it is possible to direct the oil and oil/air mix close to the wall 3 into the scavenge out-take 6.

In addition to providing a further means for drainage of oil, the drain 11 may be needed to allow any oil that fails to be directed into the off-take 6 by the baffle 8 to still be drained out of the chamber 2 particularly when the bearing 4 is not operational, that is to say is not rotating in the direction of arrowhead 5 and at such times as shut down of a machine incorporating the bearing 4 and housing 1. Finally, in choosing the particular design shape for the baffle 8, it should be understood that the baffle 8 will generate a low pressure region at the top of the scavenge out-take pipe 6 such that oil and air flows into that pipe 6. Again, as described previously, the baffle 8 may be fixed dependent upon suspected operational requirements or the baffle displaceable in terms of particularly its directional angle relative to the out-take 6 in order to enhance oil/air flow into the off-take 6.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A bearing housing comprising a chamber with out-take for oil scavenging, the out-take extending across a chordal arc of the chamber, wherein a portion of an outer wall adjacent to the out-take has a spiral divergence.

2. The bearing housing of claim 1 wherein said chordal arc extends less than ninety degrees about a center of said chamber.

3. The bearing housing of claim 2 wherein said chordal arc extends less than forty-five degrees about a center of said chamber.

4. The bearing housing of claim 1 wherein said chamber is circular on a side of said out-take opposite spiral divergence and is circular on a side of said spiral divergence opposite said out-take.

5. The bearing housing of claim 1 wherein:
    said out-take is positioned substantially at bottom dead centre of said chamber;
    said chordal arc extends less than ninety degrees about a center of said chamber; and
    said spiral divergence extends less than ninety degrees about the center of said chamber.

6. The bearing housing of claim 5 wherein:
    said chordal arc extends less than forty-five degrees about the center of said chamber; and
    said spiral divergence extends less than forty-five degrees about the center of said chamber.

* * * * *